US012732302B2

(12) United States Patent
Shimon et al.

(10) Patent No.: US 12,732,302 B2
(45) Date of Patent: Sep. 8, 2026

(54) SYSTEM, METHOD AND COMPUTER PROGRAM PRODUCT FOR DETECTION OF GNSS JAMMERS

(71) Applicant: ISRAEL AEROSPACE INDUSTRIES LTD., Lod (IL)

(72) Inventors: Yitzhak Shimon, Tel Aviv (IL); Yacov Indik, Petah Tikva (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 266 days.

(21) Appl. No.: 18/576,596

(22) PCT Filed: Jun. 22, 2022

(86) PCT No.: PCT/IL2022/050669
§ 371 (c)(1),
(2) Date: Jan. 4, 2024

(87) PCT Pub. No.: WO2023/281459
PCT Pub. Date: Jan. 12, 2023

(65) Prior Publication Data

US 2024/0297729 A1 Sep. 5, 2024

(30) Foreign Application Priority Data

Jul. 7, 2021 (IL) ........................................ 284739

(51) Int. Cl.
*H04K 3/00* (2006.01)

(52) U.S. Cl.
CPC ................ *H04K 3/90* (2013.01); *H04K 3/22* (2013.01); *H04K 3/43* (2013.01)

(58) Field of Classification Search
CPC .. H04K 3/90; H04K 3/22; H04K 3/00; H04K 3/43; H04K 3/42; H04K 3/45; H04K 3/62
See application file for complete search history.

(56) References Cited

U.S. PATENT DOCUMENTS

| | | | |
|---|---|---|---|
| 6,483,452 | B1 | 11/2002 | Iwakini |
| 2010/0045506 | A1 | 2/2010 | Law et al. |
| 2011/0151768 | A1 | 6/2011 | Snider et al. |
| 2017/0041822 | A1 | 2/2017 | Thommana et al. |

(Continued)

FOREIGN PATENT DOCUMENTS

DE 10 2021 104 439 A1 8/2022

OTHER PUBLICATIONS

Bauernfeind, et al., Analysis, Detection and Mitigation of Incar GNSS Jammer Interference in Intelligent Transport Systems, Deutsche Luft-und Raumfahrtkongress, 2012, pp. 1-10.

(Continued)

*Primary Examiner* — Keith Ferguson
(74) *Attorney, Agent, or Firm* — FisherBroyles, LLP; Roger L. Browdy; Ronni S. Jillions

(57) ABSTRACT

A system, computer program product and method facilitating safe motion of objects, including providing GNSS jammer detection functionality, including a hardware processor configured to detect jammers, to at least one networked fleet including plural moving objects, wherein at least one object has, aboard, GNSS functionality and a hardware processor, and wherein information indicative of at least one GNSS jammer position is shared between the plural moving objects.

16 Claims, 5 Drawing Sheets

(56) References Cited

U.S. PATENT DOCUMENTS

| | | | | |
|---|---|---|---|---|
| 2017/0227650 | A1 | 8/2017 | Grobert | |
| 2018/0091252 | A1 | 3/2018 | Hayman | |
| 2019/0386759 | A1* | 12/2019 | Singh | H04B 17/27 |
| 2022/0066044 | A1* | 3/2022 | McDonald | H04K 3/22 |
| 2024/0171300 | A1* | 5/2024 | Stockmaster | H04K 3/822 |
| 2025/0080248 | A1* | 3/2025 | Lee | H04B 17/345 |

OTHER PUBLICATIONS https://www.eurocontrol.int/publication/ifps-users-manual, pp. 1-2, Aug. 3, 2020.

https://insideGNSS.com/detecting-and-geolocating-jammers-and-spoofers/, IG Inside GNSS, Detecting and Geolocating Jammers and Spoofers, pp. 1-8, Sep. 30, 2019.

Dr. Heidi Kuusniemi, et al., Effects of GNSS Jammers on Consumer Grade Satellite Navigation Receivers, In Proceedings of the European Navigation Conference, Gdansk, Poland, pp. 25-27, 2012.

Dr. Heidi Kuusniemi, Effects of GNSS jammers and potential mitigation approaches, United Nations/Latvia Workshop on the Applications of GNSS May 14-18, 2012, Riga, Latvia (https://www.unoosa.org/documents/pdf/psa/activities/2012/un-latvia/ppt/3-14.pdf), p. 1-30.

https://www.septentrio.com/en/insights/GNSS-jamming-and-road-tolling, GNSS jamming and road tolling, pp. 1-9, Sep. 29, 2020.

Spirent, What is a GPS almanac?, https://www.spirent.com/blogs/2011-05-12_gps_almanac, pp. 1-4, May 1, 2011.

Wikipedia, Digital elevation model, https://en.wikipedia.org/wiki/Digital_elevation_model, pp. 1-12, Sep. 14, 2020.

Wikipedia, Geometric median, https://en.wikipedia.org/wiki/Geometric_median, pp. 1-7, May 30, 2020.

Wikipedia, Line-plane intersection, https://en.wikipedia.org/wiki/Line%E2%80%93plane_intersection, pp. 1-4, Sep. 23, 2020.

* cited by examiner

Fig. 1a

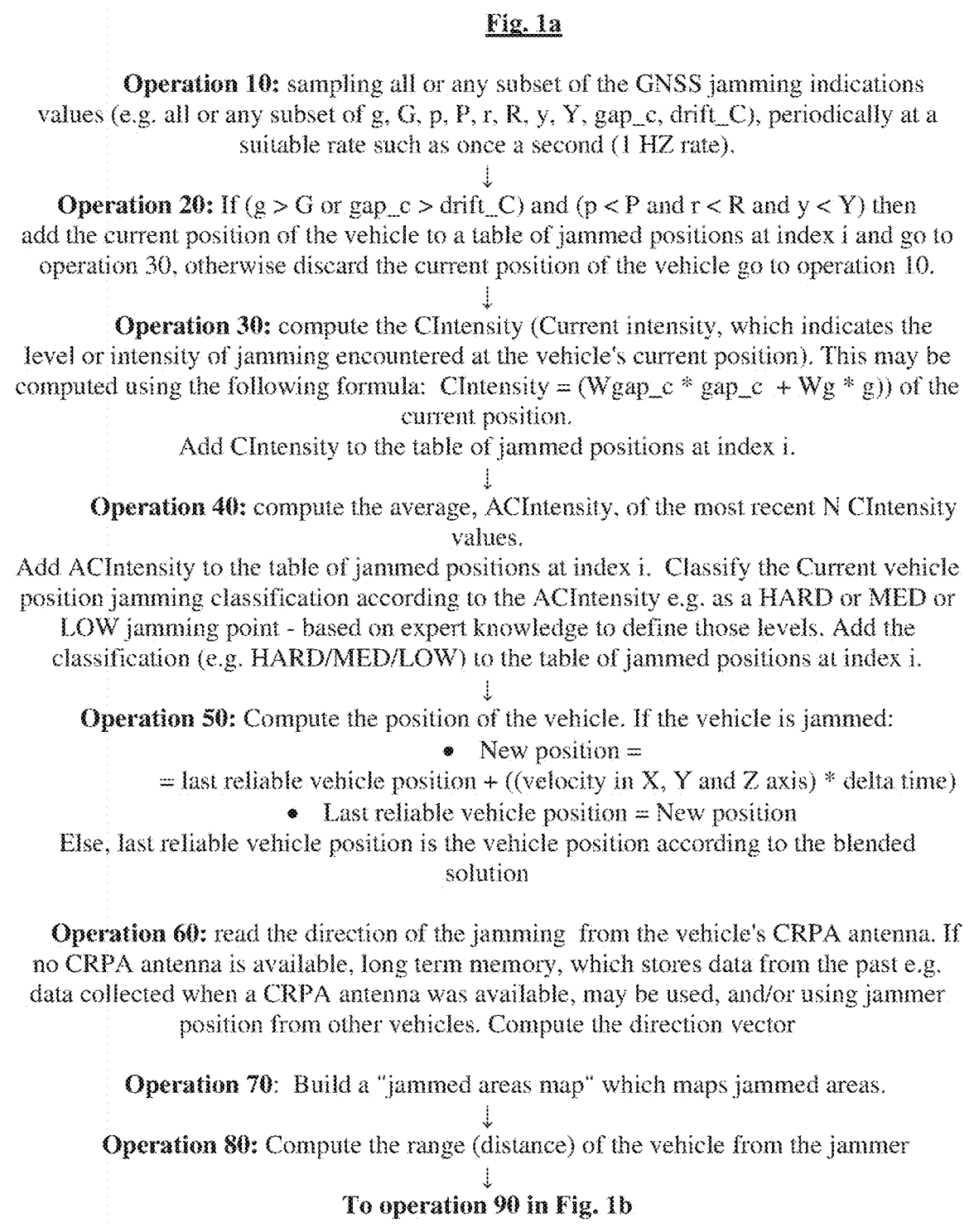

Operation 10: sampling all or any subset of the GNSS jamming indications values (e.g. all or any subset of g, G, p, P, r, R, y, Y, gap_c, drift_C), periodically at a suitable rate such as once a second (1 HZ rate).

↓

Operation 20: If (g > G or gap_c > drift_C) and (p < P and r < R and y < Y) then add the current position of the vehicle to a table of jammed positions at index i and go to operation 30, otherwise discard the current position of the vehicle go to operation 10.

↓

Operation 30: compute the CIntensity (Current intensity, which indicates the level or intensity of jamming encountered at the vehicle's current position). This may be computed using the following formula: CIntensity = (Wgap_c * gap_c + Wg * g)) of the current position.

Add CIntensity to the table of jammed positions at index i.

↓

Operation 40: compute the average, ACIntensity, of the most recent N CIntensity values.

Add ACIntensity to the table of jammed positions at index i. Classify the Current vehicle position jamming classification according to the ACIntensity e.g. as a HARD or MED or LOW jamming point - based on expert knowledge to define those levels. Add the classification (e.g. HARD/MED/LOW) to the table of jammed positions at index i.

↓

Operation 50: Compute the position of the vehicle. If the vehicle is jammed:

- New position =

= last reliable vehicle position + ((velocity in X, Y and Z axis) * delta time)

- Last reliable vehicle position = New position

Else, last reliable vehicle position is the vehicle position according to the blended solution

Operation 60: read the direction of the jamming from the vehicle's CRPA antenna. If no CRPA antenna is available, long term memory, which stores data from the past e.g. data collected when a CRPA antenna was available, may be used, and/or using jammer position from other vehicles. Compute the direction vector

Operation 70: Build a "jammed areas map" which maps jammed areas.

↓

Operation 80: Compute the range (distance) of the vehicle from the jammer

↓

To operation 90 in Fig. 1b

Fig. 1b

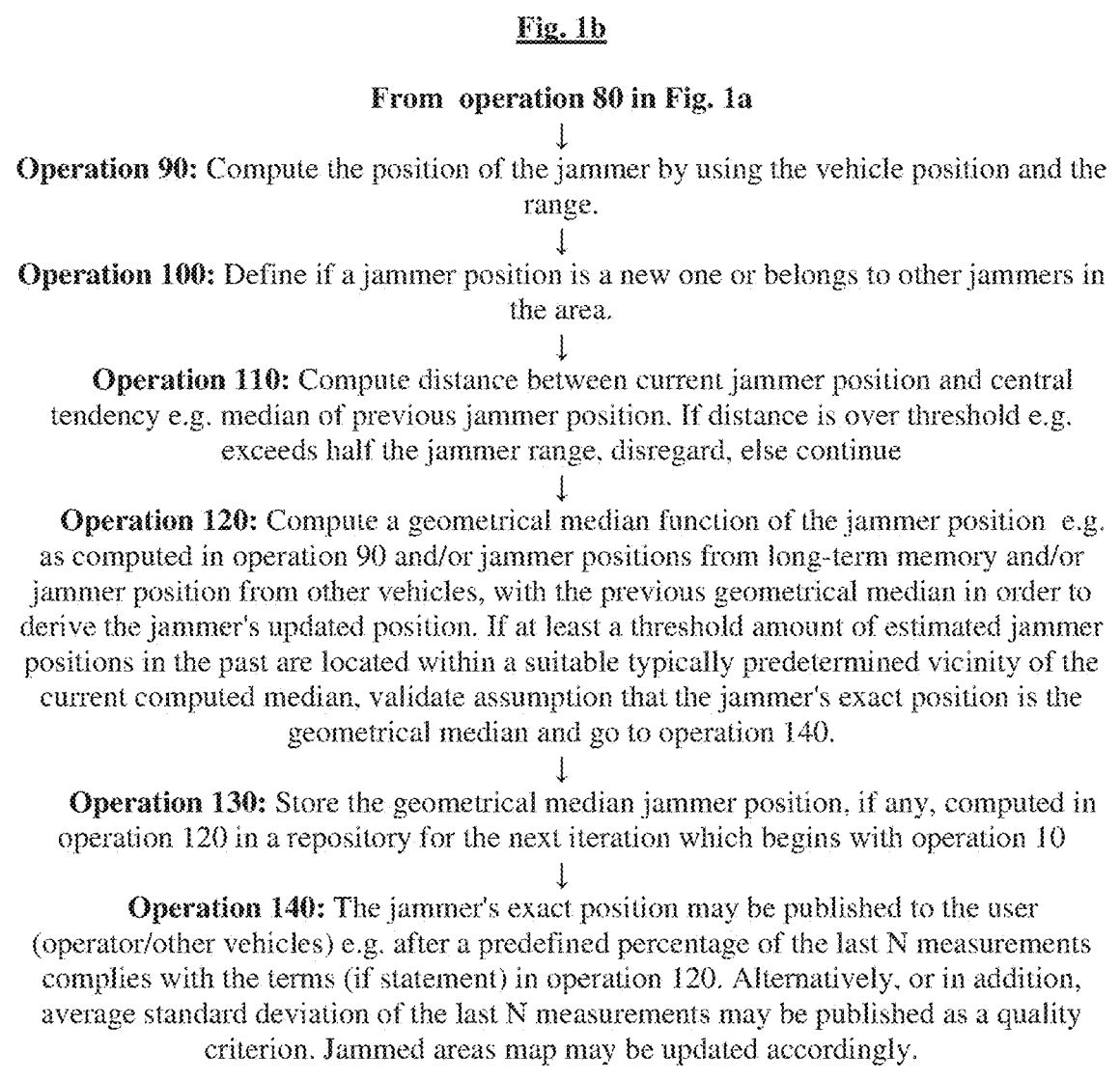

From operation 80 in Fig. 1a

↓

Operation 90: Compute the position of the jammer by using the vehicle position and the range.

↓

Operation 100: Define if a jammer position is a new one or belongs to other jammers in the area.

↓

Operation 110: Compute distance between current jammer position and central tendency e.g. median of previous jammer position. If distance is over threshold e.g. exceeds half the jammer range, disregard, else continue

↓

Operation 120: Compute a geometrical median function of the jammer position e.g. as computed in operation 90 and/or jammer positions from long-term memory and/or jammer position from other vehicles, with the previous geometrical median in order to derive the jammer's updated position. If at least a threshold amount of estimated jammer positions in the past are located within a suitable typically predetermined vicinity of the current computed median, validate assumption that the jammer's exact position is the geometrical median and go to operation 140.

↓

Operation 130: Store the geometrical median jammer position, if any, computed in operation 120 in a repository for the next iteration which begins with operation 10

↓

Operation 140: The jammer's exact position may be published to the user (operator/other vehicles) e.g. after a predefined percentage of the last N measurements complies with the terms (if statement) in operation 120. Alternatively, or in addition, average standard deviation of the last N measurements may be published as a quality criterion. Jammed areas map may be updated accordingly.

SYSTEM, METHOD AND COMPUTER PROGRAM PRODUCT FOR DETECTION OF GNSS JAMMERS

RELATED APPLICATIONS

Priority is claimed from Israeli Patent Application No. 284739 entitled "System, method and computer program product for detection of GNSS jammers" and filed on Jul. 7, 2021, the disclosure of which is hereby incorporated herein by reference.

FIELD OF THIS DISCLOSURE

The present invention relates generally to moving vehicles, and more particularly to controlling motion of moving vehicles.

BACKGROUND FOR THIS DISCLOSURE

GNSS or Global Navigation Satellite Systems includes all satellite navigation systems which give moving objects geo-spatial positioning functionality, typically worldwide. GNSS systems include, for example, the United States' Global Positioning System (GPS), GLONASS, Galileo and Beidou. For example, the GPS boasts about 30 Earth orbit satellites in six different orbital planes.

Use of illegal GNSS jammer devices can seriously affect the safety of commercial air flights. Using jammers to affect drones can seriously damage delivery services by leading carriers, such as Amazon. Jammers used e.g. by vehicles trying to escape law enforcement can create serious traffic jams.

Most commercially available drones have GPS functionality.

GNSS jamming issues are described here:

https://www.septentrio.com/en/insights/GNSS-jamming-and-road-tolling.

GNSS jammers (single-frequency and/or dual-frequency) are sold online despite being illegal in various countries. Effects of GNSS jammers on Consumer Grade Satellite Navigation Receivers are described here:

file:///C:/Users/sudym/Downloads/Kuusniemi_EtA1_NNFseminar_Oslo_24May.pdf

Methods for finding and disabling jammers, including a procedure that may be added to a GNSS receiver, are described here: https://insideGNSS.com/detecting-and-geo-locating-jammers-and-spoofers/.

Jamming detection and interference detection and mitigation are described here:https://www.unoosa.org/documents/pdf/psa/activities/2012/un-latvia/ppt/3-14.pdf Detection of in-car GNSS jammers, including a procedure that may be added to a GNSS receiver, is described here:

http://www.dglr.de/publikationen/2013/281260.pdf

The disclosures of all publications and patent documents mentioned in the specification, and of the publications and patent documents cited therein directly or indirectly, are hereby incorporated by reference other than subject matter disclaimers or disavowals. If the incorporated material is inconsistent with the express disclosure herein, the interpretation is that the express disclosure herein describes certain embodiments, whereas the incorporated material describes other embodiments. Definition/s within the incorporated material may be regarded as one possible definition for the term/s in question.

SUMMARY OF CERTAIN EMBODIMENTS

Certain embodiments seek to provide a system which provides detection of GNSS jammers. Typically, each vehicle e.g. aircraft or drone or other, detects where there seem to be jammers, based on their own data derived from their own experience. The experience/data may include all or any subset of the table/s described herein and/or any map of a region in which the vehicle is operating, which typically indicates estimated positions of any jammers that are believed to be present, and/or indicates estimated jammer intensities in various regions. For example, a given map may include first regions, indicating high alert (high probability that jammer/s is/are present), second regions, indicating medium alert for jammers, and an all clear region in which the probability that jammer/s is/are present is currently low.

Certain embodiments seek to provide a system which provides fleet-level detection of GNSS jammers. Typically, "crowd wisdom" of plural vehicles are combined to detect jammers for the benefit of all members of the fleet, better than a single fleet member, e.g. an aircraft or drone, could do by itself. Typically, each fleet member contributes information regarding where there seem to be jammers, using their own data and the experience/data of other fleet members. According to certain embodiments, the information/experience/data shared between fleet members includes any table/s described herein and/or any map of a region in which the fleet is operating, which typically indicates estimated positions of any jammers that are believed to be present and/or indicates estimated jammer intensities in various regions. For example, a given map may include red regions, indicating high alert (high probability that jammer/s is/are present), in the north east, yellow regions, indicating medium alert for jammers, in the south, and an all-clear or green region in the north west (for example), in which the probability that jammer/s is/are present is currently low.

Certain embodiments allow fleets of moving objects that use GNSS, such as but not limited to non-autonomous or autonomous cars and other vehicles, drones, ships, airplanes, to detect jammers and identify their position.

Certain embodiments locate a jammer, typically using a standard GNSS receiver to locate the jammer.

Certain embodiments of the present invention seek to provide circuitry typically comprising at least one hardware processor in communication with at least one memory, with instructions stored in such memory executed by the processor to provide functionalities which are described herein in detail. Any functionality described herein may be firmware-implemented or processor-implemented, as appropriate.

It is appreciated that any reference herein to, or recitation of, an operation being performed, e.g. if the operation is performed at least partly in software, is intended to include both an embodiment where the operation is performed in its entirety by a server A, and also to include any type of "outsourcing" or "cloud" embodiments in which the operation, or portions thereof, is or are performed by a remote processor P (or several such), which may be deployed off-shore or "on a cloud", and an output of the operation is then communicated to, e.g. over a suitable computer network, and used by, server A. Analogously, the remote processor P may not, itself, perform all of the operations, and, instead, the remote processor P itself may receive output/s of portion/s of the operation from yet another processor/s P', may be deployed off-shore relative to P, or "on a cloud", and so forth.

The present invention thus includes at least the following embodiments:

Embodiment 1. A system, computer program product or method facilitating safe motion of objects, including providing GNSS jammer detection functionality, wherein an object may have, aboard, GNSS functionality generating GNSS outputs and/or a hardware processor configured to detect jammers typically responsive to at least the GNSS outputs, and wherein information indicative of at least one GNSS jammer position may be found.

Embodiment 2. A method facilitating safe motion of objects, the method comprising: providing GNSS jammer detection functionality including a hardware processor configured to detect jammers, typically to at least one networked fleet including plural moving objects, wherein at least one object may have, aboard, GNSS functionality and/or a hardware processor, and wherein information indicative of at least one GNSS jammer position may be shared e.g. between the plural moving objects (all or any subset thereof).

Embodiment 3. The method according to the preceding embodiment wherein the GNSS jammer detection functionality includes functionality for identifying positions of GNSS jammers.

Embodiment 4. The method according to any of the preceding embodiments wherein the plural moving objects each use a satellite navigation system and wherein the hardware processor is configured to maintain a table of jammed positions, each of which is indicative of a possible GNSS jammer position, and wherein at least a portion of the table is shared between the plural moving objects.

Embodiment 5. The method according to any of the preceding embodiments and also comprising a GNSS jammer position output generator, including a hardware processor configured to generate and present a display of an area, in which the moving object is moving, in which various levels of jamming intensity are differentially presented.

Embodiment 6. The method according to any of the preceding embodiments wherein the various levels of jamming intensity are color-coded.

Embodiment 7. The method according to any of the preceding embodiments wherein the hardware processor is configured to connect geographical positions for which a first level of jamming intensity was detected, to yield a first polygon which is presented in a first manner and also to connect geographical positions for which at least a second level of jamming intensity was detected, to yield at least one second polygon which is presented in a second manner.

Embodiment 8. The method according to any of the preceding embodiments wherein the moving objects include at least one of the following groups: an aircraft, a drone, a car or other ground vehicle, and a maritime vessel.

Embodiment 9. The method according to any of the preceding embodiments wherein the hardware processor is configured to determine that certain object positions in the table of jammed positions are GNSS jammer positions, if a certain criterion is satisfied (e.g. the direction from which the jamming is coming from is a previously known GNSS jammer position).

Embodiment 10. The method according to any of the preceding embodiments wherein at least one object position which has been determined to be a GNSS jammer position, is shared between the plural moving objects, and wherein at least one object position which has not been determined to be a GNSS jammer position, is not shared between the plural moving objects.

Embodiment 11. The method according to any of the preceding embodiments wherein the first polygon presented in a first manner is presented as a first semi-transparent colored region having a first color and superimposed over a map of the area, and wherein the second polygon presented in a second manner is presented as a second semi-transparent colored region having a second color, different from the first color, and superimposed over the map of the area.

Embodiment 12. The method according to any of the preceding embodiments wherein radio communication is provided between the plural moving objects thereby to yield a networked fleet of moving objects.

Embodiment 13. The method according to any of the preceding embodiments wherein the functionality for identifying positions of GNSS jammers processes GNSS data but GNSS data which is pre-known not to be reliable for identifying positions of GNSS jammers are filtered out rather than being processed.

Embodiment 14. The method according to any of the preceding embodiments and wherein the GNSS data which is pre-known not to be reliable includes GNSS data pertaining to a time in which an aircraft is engaged in extreme maneuvers.

Embodiment 15. The method according to any of the preceding embodiments and wherein the satellite navigation system comprises GNSS.

Embodiment 16. A system facilitating safe motion of objects, wherein at least one object has, aboard, GNSS functionality and a hardware processor, the system comprising:

GNSS jammer detection functionality residing on a hardware processor in data communication with at least one networked fleet including plural moving objects, which is configured to generate information indicative of at least one GNSS jammer position for sharing between the plural moving objects.

Embodiment 17. A computer program product, comprising a non-transitory tangible computer readable medium having computer readable program code embodied therein, the computer readable program code adapted to be executed to implement a method facilitating safe motion of objects, the method comprising: providing GNSS jammer detection functionality including a hardware processor configured to detect jammers, to at least one networked fleet including plural moving objects, wherein at least one object has, aboard, GNSS functionality and a hardware processor and wherein information indicative of at least one GNSS jammer position is shared between the plural moving objects.

Also provided, excluding signals, is a computer program comprising computer program code means for performing any of the methods shown and described herein when said program is run on at least one computer; and a computer program product, comprising a typically non-transitory computer-usable or -readable medium e.g. non-transitory computer-usable or -readable storage medium, typically tangible, having a computer readable program code embodied therein, the computer readable program code adapted to be executed to implement any or all of the methods shown and described herein. The operations in accordance with the teachings herein may be performed by at least one computer specially constructed for the desired purposes, or a general purpose computer specially configured for the desired purpose by at least one computer program stored in a typically non-transitory computer readable storage medium. The term “non-transitory” is used herein to exclude transitory, propagating signals or waves, but to otherwise include any volatile or non-volatile computer memory technology suitable to the application.

Any suitable processor/s, display and input means may be used to process, display e.g. on a computer screen or other computer output device, store, and accept information such as information used by or generated by any of the methods and apparatus shown and described herein; the above processor/s, display and input means including computer programs, in accordance with all or any subset of the embodiments of the present invention. Any or all functionalities of the invention shown and described herein, such as but not limited to operations within flowcharts, may be performed by any one or more of at least one conventional personal computer processor, workstation or other programmable device or computer or electronic computing device or processor, either general-purpose or specifically constructed, used for processing; a computer display screen and/or printer and/or speaker for displaying; machine-readable memory such as flash drives, optical disks, CDROMs, DVDs, BluRays, magnetic-optical discs or other discs; RAMs, ROMs, EPROMS, EEPROMs, magnetic or optical or other cards, for storing, and keyboard or mouse for accepting. Modules illustrated and described herein may include any one or combination or plurality of a server, a data processor, a memory/computer storage, a communication interface (wireless (e.g. BLE) or wired (e.g. USB)), a computer program stored in memory/computer storage.

The term "process" as used above is intended to include any type of computation or manipulation or transformation of data represented as physical, e.g. electronic, phenomena which may occur or reside e.g. within registers and/or memories of at least one computer or processor. Use of nouns in singular form is not intended to be limiting; thus the term processor is intended to include a plurality of processing units which may be distributed or remote, the term server is intended to include plural typically interconnected modules running on plural respective servers, and so forth.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements all or any subset of the apparatus, methods, features and functionalities of the invention shown and described herein. Alternatively, or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may, wherever suitable, operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless stated otherwise, terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining", "providing", "accessing", "setting" or the like, refer to the action and/or processes of at least one computer/s or computing system/s, or processor/s or similar electronic computing device/s or circuitry, that manipulate and/or transform data which may be represented as physical, such as electronic, quantities e.g. within the computing system's registers and/or memories, and/or may be provided on-the-fly, into other data which may be similarly represented as physical quantities within the computing system's memories, registers or other such information storage, transmission or display devices or may be provided to external factors e.g. via a suitable data network. The term "computer" should be broadly construed to cover any kind of electronic device with data processing capabilities, including, by way of non-limiting example, personal computers, servers, embedded cores, computing system, communication devices, processors (e.g. digital signal processor (DSP), microcontrollers, field programmable gate array (FPGA), application specific integrated circuit (ASIC), etc.) and other electronic computing devices. Any reference to a computer, controller or processor is intended to include one or more hardware devices e.g. chips, which may be co-located or remote from one another. Any controller or processor may for example comprise at least one CPU, DSP, FPGA or ASIC, suitably configured in accordance with the logic and functionalities described herein.

Any feature or logic or functionality described herein may be implemented by processor/s or controller/s configured as per the described feature or logic or functionality, even if the processor/s or controller/s are not specifically illustrated for simplicity. The controller or processor may be implemented in hardware, e.g., using one or more Application-Specific Integrated Circuits (ASICs) or Field-Programmable Gate Arrays (FPGAs) or may comprise a microprocessor that runs suitable software, or a combination of hardware and software elements.

The present invention may be described, merely for clarity, in terms of terminology specific to, or references to, particular programming languages, operating systems, browsers, system versions, individual products, protocols and the like. It will be appreciated that this terminology or such reference/s is intended to convey general principles of operation clearly and briefly, by way of example, and is not intended to limit the scope of the invention solely to a particular programming language, operating system, browser, system version, or individual product or protocol. Nonetheless, the disclosure of the standard or other professional literature defining the programming language, operating system, browser, system version, or individual product or protocol in question, is incorporated by reference herein in its entirety.

Elements separately listed herein need not be distinct components, and, alternatively, may be the same structure. A statement that an element or feature may exist is intended to include (a) embodiments in which the element or feature exists; (b) embodiments in which the element or feature does not exist; and (c) embodiments in which the element or feature exist selectably e.g. a user may configure or select whether the element or feature does or does not exist.

Any suitable input device, such as but not limited to a sensor, may be used to generate or otherwise provide information received by the apparatus and methods shown and described herein. Any suitable output device or display may be used to display or output information generated by the apparatus and methods shown and described herein. Any suitable processor/s may be employed to compute or generate or route, or otherwise manipulate or process information as described herein and/or to perform functionalities described herein and/or to implement any engine, interface or other system illustrated or described herein. Any suitable computerized data storage e.g. computer memory may be used to store information received by or generated by the systems shown and described herein. Functionalities shown and described herein may be divided between a server computer and a plurality of client computers. These or any other computerized components shown and described herein may communicate between themselves via a suitable computer network.

The system shown and described herein may include user interface/s e.g. as described herein which may for example include all or any subset of an interactive voice response interface, automated response tool, speech-to-text transcription system, automated digital or electronic interface having interactive visual components, web portal, visual interface loaded as web page/s or screen/s from server/s via communication network/s to a web browser or other application downloaded onto a user's device, and automated speech-to-text conversion tool, including a front-end interface portion thereof and back-end logic interacting therewith. Thus the term user interface or "UI" as used herein, includes also the underlying logic which controls the data presented to the user e.g. by the system display and receives and processes and/or provides to other modules herein, data entered by a user e.g. using her or his workstation/device.

BRIEF DESCRIPTION OF THE DRAWINGS

Example embodiments are illustrated in the various drawings. Specifically:

FIGS. 1*a*-1*b*, taken together, form a simplified flowchart illustration of a jammer position detection method according to certain embodiments; the method may include all or any subset of the operations 10, 20, . . . shown and described herein, in any suitable order e.g. as shown.

Figure 2A:
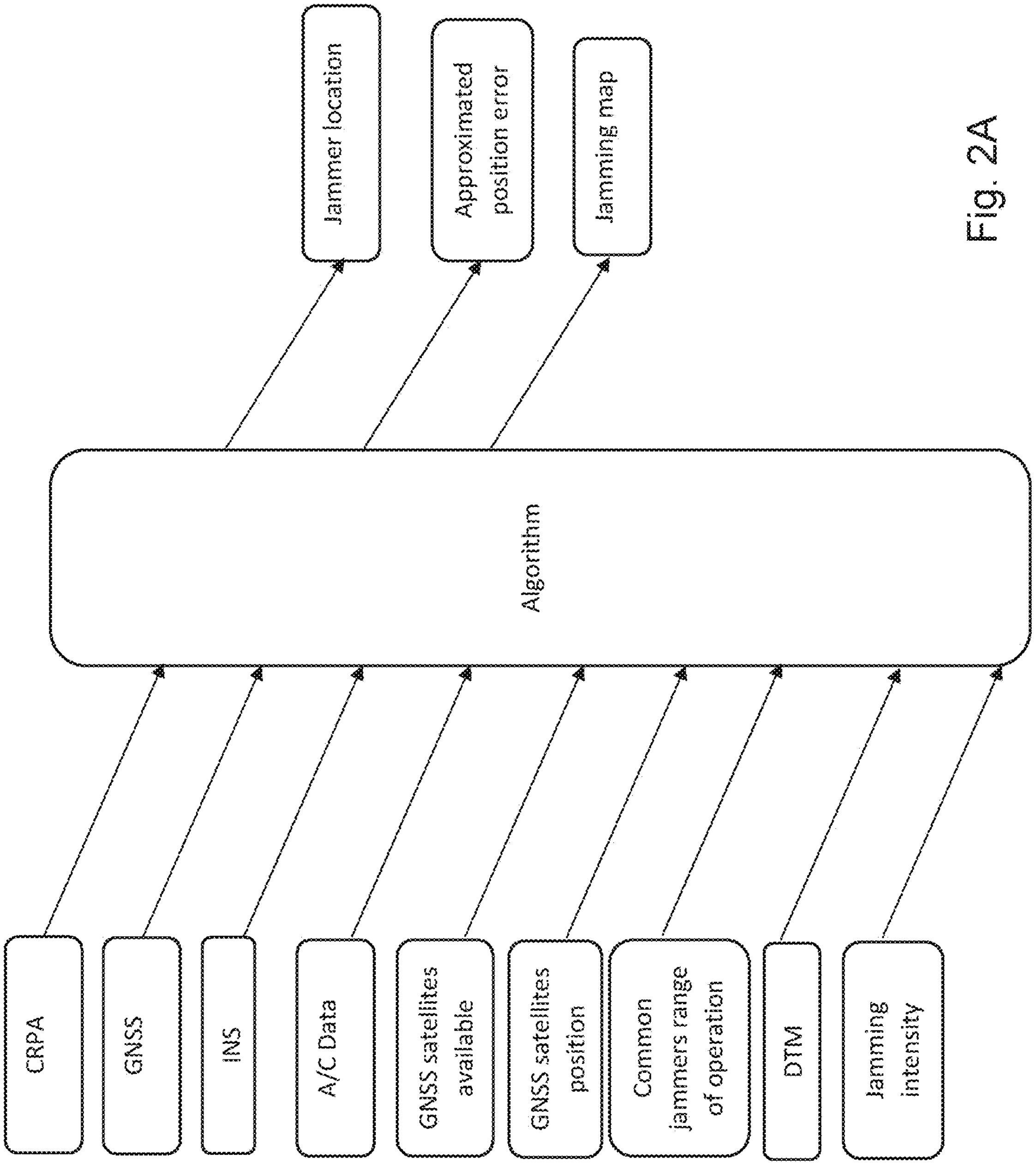
FIG. 2*a* is a simplified block diagram illustration of an example architecture for a jammer detection system according to certain embodiments; all or any subset of the illustrated functionalities, all or any subset of the illustrated inputs, and all or any subset of the illustrated outputs, may be provided. The architecture may employ, typically repeatedly e.g. continuously, or periodically e.g., say, once per second, any suitable jammer position detection method e.g. the method of FIGS. 1*a*-1*b*, taken together, or any subset of its operations, in any suitable order.

Certain embodiments of the present invention are illustrated in the drawings; in the block diagrams, arrows between modules may be implemented as APIs and any suitable technology may be used for interconnecting functional components or modules illustrated herein in a suitable sequence or order e.g. via a suitable API/Interface. For example, state of the art tools may be employed, such as but not limited to Apache Thrift and Avro which provide remote call support. Or, a standard communication protocol may be employed, such as but not limited to HTTP or MQTT, and may be combined with a standard data format, such as but not limited to JSON or XML.

Methods and systems included in the scope of the present invention may include any subset or all of the functional blocks shown in the specifically illustrated implementations by way of example, in any suitable order e.g. as shown. Flows may include all or any subset of the illustrated operations, suitably ordered e.g. as shown. Tables herein may include all or any subset of the fields and/or records and/or cells and/or rows and/or columns described.

Computational, functional or logical components described and illustrated herein can be implemented in various forms, for example as hardware circuits such as but not limited to custom VLSI circuits or gate arrays, or programmable hardware devices such as but not limited to FPGAs, or as software program code stored on at least one tangible or intangible computer readable medium and executable by at least one processor, or any suitable combination thereof. A specific functional component may be formed by one particular sequence of software code, or by a plurality of such, which collectively act or behave or act as described herein with reference to the functional component in question. For example, the component may be distributed over several code sequences, such as but not limited to objects, procedures, functions, routines and programs, and may originate from several computer files which typically operate synergistically.

Each functionality or method herein may be implemented in software (e.g. for execution on suitable processing hardware such as a microprocessor or digital signal processor), firmware, hardware (using any conventional hardware technology such as Integrated Circuit technology) or any combination thereof.

Functionality or operations stipulated as being software-implemented may alternatively be wholly or fully implemented by an equivalent hardware or firmware module, and vice-versa. Firmware implementing functionality described herein, if provided, may be held in any suitable memory device and a suitable processing unit (aka processor) may be configured for executing firmware code. Alternatively, certain embodiments described herein may be implemented partly or exclusively in hardware, in which case all or any subset of the variables, parameters, and computations described herein may be in hardware.

Any module or functionality described herein may comprise a suitably configured hardware component or circuitry. Alternatively or in addition, modules or functionality described herein may be performed by a general purpose computer, or more generally by a suitable microprocessor, configured in accordance with methods shown and described herein, or any suitable subset, in any suitable order, of the operations included in such methods, or in accordance with methods known in the art.

Any logical functionality described herein may be implemented as a real time application, if and as appropriate, and which may employ any suitable architectural option, such as but not limited to FPGA, ASIC or DSP, or any suitable combination thereof.

Any hardware component mentioned herein may in fact include either one or more hardware devices e.g. chips, which may be co-located or remote from one another.

Any method described herein is intended to include, within the scope of the embodiments of the present invention, also any software or computer program performing all or any subset of the method's operations, including a mobile application, platform or operating system e.g. as stored in a medium, as well as combining the computer program with a hardware device to perform all or any subset of the operations of the method.

Data can be stored on one or more tangible or intangible computer readable media stored at one or more different locations, different network nodes, or different storage devices at a single node or location.

It is appreciated that any computer data storage technology, including any type of storage or memory and any type of computer components and recording media that retain digital data used for computing for an interval of time, and any type of information retention technology, may be used to store the various data provided and employed herein. Suitable computer data storage or information retention apparatus may include apparatus which is primary, secondary, tertiary or off-line, which is of any type or level or amount or category of volatility, differentiation, mutability, accessibility, addressability, capacity, performance and energy use, and which is based on any suitable technologies, such as semiconductor, magnetic, optical, paper, and others.

DETAILED DESCRIPTION OF CERTAIN EMBODIMENTS

Certain embodiments e.g. as described herein seek to provide a system and method for detecting that an aircraft or other vehicle is being jammed, and for computing position of the GNSS jammer, if any—typically by constantly or continuously or frequently monitoring data which may be aircraft-provided. Typically, the data is provided by the aircraft's navigation system e.g. GNSS receiver and/or INS. If an aircraft is being jammed, an alert may be provided to the operator e.g. by displaying a message on the operator's navigation screen and/or by playing a vocal alert. Typically, there are plural such aircraft (or, more generally, plural members of a networked fleet).

The GNSS jammer position is typically computed by bootstrapping estimates of the GNSS jammer position provided by the vehicle/plural vehicle (or, more generally, here and vis a vis all other references to vehicle herein, by plural members of a networked fleet). Any suitable method may be used to combine jammer position estimates generated by a fleet member/various fleet members, such as simple averaging or weighted averaging using any suitable weights which may be based, say, on how reliable a given jammer position estimate is judged to be; for example if a fleet member is engaging in extreme maneuvers, its position estimate, if provided at all, rather than being filtered out, may be judged as relatively unreliable; and/or on how recent a reliable jammer position estimate is. It is appreciated that any suitable technology may be employed to group estimates so as to identify the number of jammers which appear to be present, and to determine which estimates apply to which jammer, such as cluster analysis.

It is appreciated that each networked member's estimate of a jammer position may be determined as a function of that member's own position as best known e.g. to the member himself/itself. This self-position estimate may be based on GNSS data or, if the GNSS data contributing to a self-position is deemed unreliable because the fleet member suspects a jammer is in the fleet member's vicinity (e.g. identifies that reception is poor, as in below-threshold), the self-position estimate may be computed by the networked member based on the most recent self-position that is deemed reliable (e.g. the most recent position computed while reception was deemed above-threshold), updated using velocity and/or acceleration and/or position data which may, for example, be provided by the aircraft's avionics systems, or by self-positioning or navigation subsystems serving other vehicles.

Typically, the system does not assume there is or is not a GNSS jammer about. Typically, series of collected data (e.g. by the vehicle) are analyzed e.g. according to a suitable data model including rules (e.g. what is the "legal" number of available GNSS satellites) and/or computational functions (e.g. geometrical median) in order to determine the jamming situation and/or in order to determine a jammer position. The model typically can be updated during the system's life cycle, by the solution supplier and/or by the customer. Developing the model includes collecting raw data (e.g. aircraft maneuver) from the avionics systems and from experts (e.g. common range of jammers types—every jammer type has its unique characteristics including its range, static or dynamic position, and coverage). The data model is typically tested with recording files from the system. Typically, during the development process of the system, record files are generated, of real or simulated avionic and jammers data produced during real or simulated flights. The system developers may use those files to generate an accurate model. The system may be expected to locate the position of the jammers which were used during the development phase. The data model typically includes a data structure (such as an XML structure) and/or rules that may be applied to data elements (e.g. "when number of available satellites is less than 4, the vehicle is assumed to be jammed"). This allows the system to differentiate jamming from other situations such as breakdown or a temporary blocking.

The system or method may include a Filtering Process (e.g. ignoring aircraft maneuver in which a GNSS satellite may not be reliable) in order to update the data model and/or to verify that the jamming event is real. The algorithm of FIG. 2*a*, e.g. any suitable process for estimating GNSS jammer positions such as the method of FIGS. 1*a*-1*b*, taken together, may then take place or be executed, only for inputs that the filtering process passes or allows, e.g. to eliminate information that may produce "false positive" indications, for example, when the aircraft is engaged in flight involving extreme maneuvers (e.g. the aircraft flying upside down, extreme (over threshold) acceleration, sharp (number of radians over threshold) turn, etc.; it is appreciated that each aircraft can become aware of such situations from its own avionics systems. Thus, GNSS data may be filtered out rather than being processed, each time the aircraft is engaged in flight involving extreme maneuvers. Alternatively, GNSS data may be weighted differently, depending on an extent to which the aircraft is engaged in flight involving extreme maneuvers.

The filtering process may be applied as a function of all or any subset of the following information:

1. aircraft maneuver
2. Data Sample rate
3. Sequence of jamming events

The system may determine that the vehicle is being jammed, according to all or subset of the following information or criteria which are indicative thereof, especially in combination:

1. Satellite/s used by the navigation system on the platform is/are different than expected
2. The direction from which the GNSS transmission is coming from, may be different than expected
3. Position error measurement provided by the GNSS is above a given threshold
4. Time error measurement is above a given threshold
5. GNSS position and INS position are different than expected
6. Information from another vehicle (optional) regarding a given position A method of operation may be provided in accordance with certain embodiments, for areas in which a jammer may be present. For each geographic position there may be a data structure (subset of the data model) which represents a typical situation. Typically, the profile is a set of data, stored in memory by the platform, that presents the definition and the behavior of an object (e.g. a profile which includes the geographical position of the jammer). Profile behavior may include expected or typical or observed operation hours and or range of a jammer. Then, according to the behavior of the object, the system can determine if there is an exception which can imply a jamming situation. For example, when the position error received by the GNSS is bigger than the expected profile behavior, this may mean (e.g. at a certain confidence level) that the vehicle is being jammed. If the position error that is being received by the GNSS is smaller or equal to the expected profile behavior, the vehicle is probably (e.g. at a certain confidence level) not being jammed. For example, when the time error received by the GNSS is bigger than the expected profile behavior, this may mean (e.g. at a certain confidence level) that the vehicle is probably being jammed. If the time error that is being received by the GNSS is smaller or equal to the expected profile behavior, the vehicle is probably (e.g. at a certain confidence level) not being jammed.

The method typically comprises all or any subset of the following operations, suitably ordered e.g. as follows:

a. The system receives information (e.g. navigation data)
b. The system filters the data to process only reliable information, and discards unreliable information
c. The system compares the incoming data (e.g. as filtered) with expected data e.g. as defined in a previously stored profile.

Inputs to the method and system shown and described herein may (e.g. as shown in FIG. 2*a*) include all or any subset of the following which may be provided at any suitable interval e.g. periodically e.g. once per second:

1. Data from vehicle's CRPA (controlled Reception Pattern Array—adjustable antenna) Antenna (if available)
2. Data from vehicle's GNSS (Global Navigation Satellite System). It may be assumed that after the filter process, the GNSS data can be handled by the jamming position detection method of FIG. 2*a* to imply a jamming situation.
3. Data from vehicle's INS (Inertial Navigation Systems, may optionally be GNSS-aided)
4. Other vehicle data (information that define vehicle's position and/or vehicle clock) provided by smart sensors on the vehicle
5. Number of GNSS satellites available—data may be supplied by the vehicle's GNSS navigation system, periodically, e.g. once per second
6. Position of GNSS satellites—may be supplied by the vehicle's GNSS navigation system, periodically, e.g. once per second
7. Common jammers range of operation—typically, the system maintains a jammer DB, that may collect information regarding (e.g. range of operation of) jammers which have been encountered to date, by a given vehicle A and typically also by other vehicle which cooperate with vehicle A.

The jammer DB maintains or stores position and type information regarding jammers. This information is typically continuously updated from all or any subset of the following three resources:

R1. Available offline information regarding known jammers (such as jammer information that was reported from other aircrafts from previous flights, previous knowledge from other resources, such as law enforcement).

R2. On Line information from the processor's own vehicle

R3. Network information from other vehicles networked to the processor's own vehicle.

The information held by the jammer DB may include both information regarding positions of jammers in the area, and/or technical information characterizing various jammer types (i.e. range of operation, size etc.).
8. DTM-Digital Terrain Model/s. typically, the system maintains terrain data repository, that stores information regarding the terrain over which the aircraft is flying such as a DTM or digital elevation model e.g. as described here: https://en.wikipedia.org/wiki/Digital_elevation_model.
9. Jamming intensity and continuity (typically of jammers previously encountered, by a given vehicle A and/or by other vehicle which cooperate with e.g. are networked with vehicle A.

Figure 3:
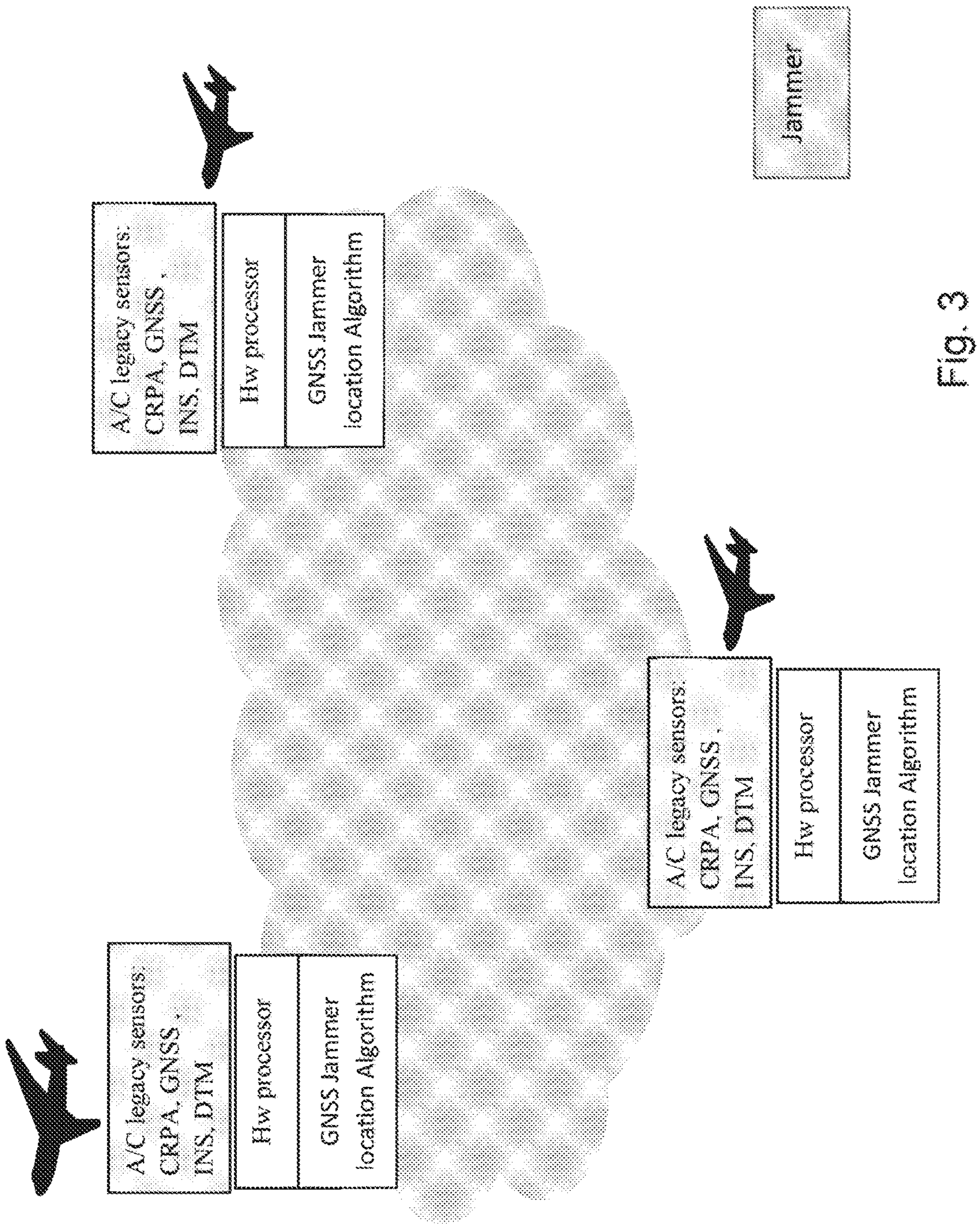
FIG. 3 is a semi-block diagram semi-pictorial illustration of a fleet of networked vehicles or platforms, with communication e.g. radio communication therebetween, wherein each vehicle or member in the fleet is configured to utilize a jammer detection system according to certain embodiments.

FIG. 3 is a semi-pictorial diagram of the system, including at least one hardware processor that may perform the method of FIGS. 1*a*-1*b*, taken together, described herein, or known equivalents or any subset of the operations of FIGS. 1*a*-1*b*, taken together. The processor typically resides on each platform, e.g. vehicle, where each vehicle typically includes legacy sensors such as but not limited to all or any subset of the following: CRPA sensors, GNSS sensors, INS sensors, DTM sensors, e.g. as shown in FIG. 2*a*.

The platforms typically comprise networked platforms e.g. using radio communication to send and receive from one platform to another (such as Eurocontrol) which may be regulated by any suitable standard, such as for example a User's Manual such as https://www.eurocontrol.int/publication/ifps-users-manual The method of FIGS. 1*a*-1*b*, taken together, may compute the position of the jammer even without the CRPA, by using information from the vehicle's long-term memory (saved from the vehicle or received from other vehicles) regarding the same area, by performing polygon's intersection.

The CRPA information may be used when the CRPA communicates with the algorithm of FIG. 2*a* on the vehicle. The method may be the same for both cases, except from using Long Term Memory—LTM e.g. information accumulated from previous flights that can be used e.g. in a specific profile for accurate positioning of the jammer when the CRPA is not available in subsequent flights, in order to determine jammer position during at least one subsequent flight.

The method of FIGS. 1*a*-1*b*, taken together, may include all or any subset of the following operations, suitably ordered e.g. as follows:

Operation 10: sampling all or any subset of the GNSS jamming indications values, periodically at a suitable rate such as once a second (1 HZ rate). Typically, all operations of FIGS. 1*a*-1*b*, taken together, are performed sequentially, periodically, e.g. once a second. The values sampled typically include general data and/or aircraft maneuver information and/or aircraft position information.

The general data typically includes all or any subset of the following:

10i. N, Number of available satellites (an input from the vehicle's navigation system) is less than the expected. The expected number may be known to the system using prior knowledge from a GNSS system expert. Typically, between 4-7 satellites are available in a GPS system.

10ii. S, Satellites used by the GNSS (an input from the vehicle's navigation system) have different (ID) than expected (to be determined according to the GNSS system expert, according to the GNSS system almanac).

As described in https://www.spirent.com/blogs/2011-05-12_gps_almanac, in the art of satellite navigation systems, "the almanac is a regularly updated digital schedule of satellite orbital parameters for use by GNSS receivers. The almanac for any given GNSS consists of coarse orbit and status information covering every satellite in the constellation, the relevant ionospheric model and time-related information. For example, the GPS almanac provides the necessary correction factor to relate GPS time to co-ordinated universal time (UTC). The major role of the almanac is to help a GNSS receiver to acquire satellite signals from a cold or warm start by providing data on which satellites may be visible at any given time, together with their approximate positions. An ephemeris message is still required from each satellite for the receiver to compute the exact position, but it is the almanac for the constellation that gives the receiver its starting point.

The ionospheric model contained within the almanac is essential for single-frequency receivers to correct for ionospheric errors—the largest error source for GPS receivers. However, modern dual-frequency receivers have no need for this data as the dual-frequency design can correct for such errors without any assumed model."

10iii. Po, Position error measurement (an input from the vehicle's navigation system indicating the possible error in the vehicle's own position)

10iv. T, Time error measurement (an input from the vehicle's navigation system indicating the possible error in knowledge of the current time)

10v. Current gap g (aka current computed result), computed by combining all or any subset of the 4 above parameters, e.g.

$$g=W1*N+W2*S+W3*Po+W4*T$$

It is appreciated that N, S, Po and T each contribute to the error hence gap g. Typically, the weights are determined according to experimentation, including many measurements by a human expert before activating the system. In order to set up the weights, a simulation environment may be built that simulates, typically off-line e.g. during development of the system shown and described herein, GNSS jammers in a pre-known position and vehicle data (e.g. navigation data). A human expert may determine the weights in order to locate the pre-known position of the GNNS jammers. This process is typically run several times and in several scenarios in order to build a reliable algorithm.

10vi. Gap indicator G (aka standard computed result), standard error hence standard gap G. G is stored in the system's long term memory and is based on field tests (flight+simulation environment) in which the process was used in order to locate jammers.

G=Average (g(1) . . . g(N)) (previous computed results-in case that g(i) is less than 3 standard deviations that were computed for g(1) . . . g(N))

10vii. The aircraft maneuver information typically includes all or any subset of the following: Current Pitch, Roll, Yaw values, designated herein as p r y respectively; and/or maximum allowed values (which may be based on expert knowledge) for Pitch, Roll, Yaw, designated herein as P R Y respectively.

10viii. The vehicle position information typically includes all or any subset of the following:

a. Current vehicle position according to GNSS, INS, GNSS/INS (the navigation system provides all the relevant information which may include only GNSS, may include only INS, and may combine both ("blended solution").

b. Vehicle position gap gap_c which represents the actual difference between the current vehicle position as per the blended solution, and the vehicle position based only on INS.

c. Expected vehicle position gap drift_C which represents the expected difference between the current vehicle position as per the blended solution, and the vehicle position based only on INS.

Each INS system has unique drift rate.

drift_C typically includes Flight Time (hours) and/or Drift per hour (predefined drift, which may be expressed in nanometers, which is expected per hour), thus allowing the Expected drift_C to be computed by multiplying Flight Time X Drift per hour.

Operation 20: If (g>G or gap_c>drift_C) and (p<P and r<R and y<Y) then add the current position of the vehicle to jammed positions table at index i and go to operation 30, otherwise discard the current position of the vehicle and go to operation 10.

Operation 30: compute the CIntensity (Current intensity, which indicates the level or intensity of jamming encountered at the vehicle's current position). This may be computed using the following formula: CIntensity=(Wgap_c*gap_c+Wg*g)) of the current position. Add CIntensity to jammed positions table at index i. A human expert may determine the weights Wgap_c, Wg.

Operation 40: compute the average, ACIntensity, of the most recent N CIntensity values.

Add ACIntensity to jammed positions table at index i.

CP=Current vehicle position jamming classification

ACIntensity=Average (CIntensity (1) . . . . CIntensity (N))

If ACIntensity>=Hard Criterion, CP=HARD

If ACIntensity<Hard Criterion and ACIntensity>=Med Criterion, CP=MED

If ACIntensity<Low Criterion, CP=LOW

Hard Criterion, Med Criterion, Low Criterion is based on expert knowledge

Add the classification (e.g. HARD/MED/LOW) to jammed positions table at index i.

Operation 50: Compute the vehicle position:

If the vehicle is jammed (CP/LOW):

vehicle position=last reliable vehicle position+((velocity in X, Y and Z axis)*delta time)

last reliable vehicle position=vehicle position

Else, last reliable vehicle position is the vehicle position according to the blended solution.

Operation 60: read the direction, absolute and/or relative) of the jamming from the vehicle's CRPA antenna (a feature in the CRPA interface). If no CRPA antenna is available, long term memory, which stores data from the past e.g. data collected when a CRPA antenna was available, may be used, and/or using the jammer position from other vehicles.

Relative jammer direction typically comprises the direction of the jammer according to the CRPA antenna (relative to the aircraft maneuver).

Absolute jammer direction typically comprises a computed direction of the jammer relative to a reference direction, e.g. the north (aircraft direction relative to the north+/− relative jammer direction).

Absolute jammer direction=(aircraft direction relative to the north)+/−(relative jammer direction)

Direction vector typically comprises a vector from the current vehicle position to the jammer according to the jammer's absolute jammer direction. The starting point or origin of the vector typically comprises the current position of the vehicle.

Direction vector=last reliable vehicle position+Absolute jammer direction Add the direction vector to jammed positions table at index i.

Operation 70: Build a "jammed areas map" which maps jammed areas. If the jammed position classification is greater than MED (e.g. is HARD), send the position and the CIntensity to the vehicles network in order to build a "jammed areas map" that presents jammed areas' locations and/or the intensity of each such area.

Operation 80: Compute the range (distance) of the vehicle from the jammer according to all or any subset of the following data, inter alia:

70i: The range is computed according the CIntensity (operation 30) and a predefined table which may be based on a priori expert knowledge. It is appreciated that, typically, the stronger the intensity, the shorter the range.

e.g. range=a*CIntensity+b, where a and b are constants

70ii: DTM (Digital Terrain Model) data characterizing the terrain over which the aircraft is flying to determine the range from the jammer position by computing the intersection between the direction vector (operation 50) and the surface (geographic position) e.g. as described in the following:

e.g. https://en.wikipedia.org/wiki/Line%E2%80%93plane_intersection

70iii: Using predefined jammers range (which may be stored in the system's long-term memory). For example, if the strongest or highest intensity of the known jammers can jam GNSS in a range of 50 KM, the range may not exceed 50 KM.

Operation 90: Compute the position of the jammer by using the vehicle position and the range.

Current jammer position=vehicle position+range (according to the direction) Add the current jammer position to jammed positions table at index i.

Operation 100: Define if a jammer position is a new one or belongs to other jammers in the area. The operation 100 may include operations 100*i* and/or 100*ii*, e.g. as described below.

Operation 100*i*: The system may assume that all jammers in a predefined area (e.g. in a vicinity e.g. circle whose radius is a predefined value, surrounding a given vehicle) are the same jammer, in which case the system may receive second estimations of jammer position (if any exist) from other vehicle within the predefined vicinity (jammer range), within a time-interval of predefined duration (seconds, for example 35 seconds).

Operation 100*ii*: Retrieve, e.g. from the vehicle's long-term memory or wherever the jammer database described herein is stored), information regarding position of jammers in this specific area (predefined vicinity of the vehicle position e.g.) in a time-interval of predefined duration, such as 35 seconds.

Operation 110: Compute the distance between the current jammer position and the median of the previous jammer position E.g. using distance=current jammer position−median(jammer position (1) . . . jammer position (N))

If the distance is bigger than half of the jammer range (for example: 5 KM) ignore it, else continue.

Operation 120: Compute a geometrical median function (e.g. https://en.wikipedia.org/wiki/Geometric_median) of the computed jammer position (operation 90) and/or jammer positions from long-term memory and/or jammer position from other vehicles, with the previous geometrical median in order to derive the jammer's updated position. For example:

Median Jammer position=geometrical median (jammer position (1) . . . jammer position (N))

If 75% (predefine value) of the estimated jammer positions in the past are located within a distance of, say, 2 standard deviations, or less than, say, 100 meters, from the current computed median, this validates assuming that the jammer exact position is the Median Jammer position (geometrical median).

If the jammer exact position is valid the method typically proceeds to operation 140.

Operation 130: Store the Median Jammer position, if any, computed in operation 120, in a repository for the next iteration (that begins in operation 10)

Operation 140: The jammer exact position may be published to the user (operator/other vehicles) after a predefined percentage (for example: 90%) of the last N measurements (predefined number of jammer positions) comply with the terms in operation 120. In addition, the average standard deviation of the last N measurements may be published (as a quality criteria). In addition, this information may be updated on the "jammed areas map".

Use cases include identifying jammers which are hampering aircraft including commercial aircraft whose flight routes hardly change. At least in civilian use-cases, flight routes are well defined, hence can support building a reliable database storing information regarding jammers typically including jammer position/s and/or types (e.g. by sharing the information between the aircrafts). The fact that aircraft typically fly along predefined routes can provide more computed jammer positions in the same area, which facilitates provision of precise jammer positions.

Finding the position of a GNSS jammer may facilitate elimination of the GNSS jammer by local law enforcement authorities, in order to make flights safer or plan alternative routes which have less GNSS jamming, or no GNSS jamming, and/or, alerting other objects e.g. airplanes about a GNSS jammer allows these objects to refrain from entering the range of the GNSS jammer and/or to use an alternative other than GNSS, for navigation.

According to certain embodiments, each object moving in a jamming area (region in which a jammer is operating) computes the jammer position plural times e.g. periodically e.g. at least once a second. As computations accumulate, the accuracy of the estimated position of the jammer, improves.

If a specific vehicle allocates or detects a jammer position, at a threshold level of accuracy (e.g. if the vehicle manages to accumulate enough samples, according to operation 120), then that vehicle's data (including jammer position estimation) may be shared with other vehicle that may then use that data to improve their own computing of the jammer position, or to further improve the estimate of the jammer's position.

Outputs of the flow of FIGS. 1*a*-1*b*, for each iteration thereof performed by a given vehicle, typically includes all or any subset of the following:

a. Position of the jammer e.g. as estimated in operation 120; and/or b. Approximated position error e.g. the estimated error in the jammer position e.g. as computed in operation 140.

c. A map of jammed areas that may be distributed to others e.g. to other networked objects e.g. as shown in FIG. 2*b*.

Typically, a DB is maintained which contains geographical positions where the vehicle has been. The distance in meters (or time interval) between adjacent geographic positions is typically constant. For each geographic position, the encountered jamming intensity level (HARD/MED/LOW) is saved, and colored polygons (which may be, say, red, yellow) are generated by connecting all geographical positions for which the level of jamming intensity encountered was MED, to yield a first polygon which is colored yellow (say), and, similarly, connecting all geographical positions for which the level of jamming intensity encountered was HARD to yield a second polygon, and coloring that polygon red (say).

Alternatively, or in addition, the polygons' colors may indicate a probability or confidence that a jammer is present.

Figure 2B:
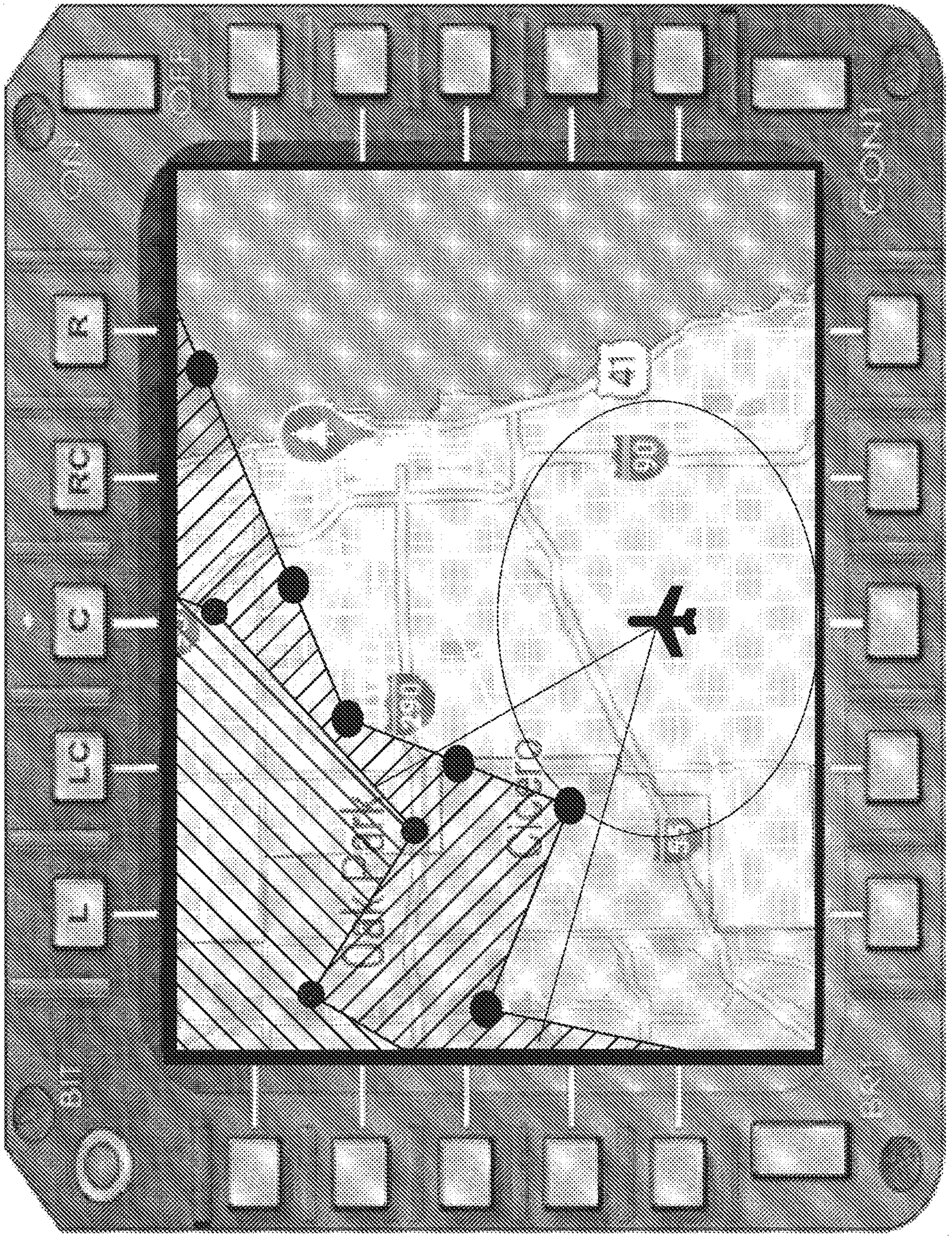
FIG. 2*b* is a pictorial illustration of a map or visual display that may be generated by a GNSS jammer position output generator e.g. hardware processor and presented to an operator, using color-coding (say) to represent several e.g. 3 areas of higher vs. lower levels of jamming intensity.

In FIGS. 2*b*, 3 (by way of example) various colors indicating various levels of jamming intensity are represented in monochrome as forward slanting hatching (///), back-slanting hatching (\\\), and no hatching, respectively.

This DB is shared between the vehicles (each vehicle creates its own map based on the information received from other vehicles and from its own system). A visual display may be presented, e.g. to operators, that show the vehicle in a jammed position area in the visual display, aka map. This data may be sent between the networked fleet members; the data sent may include the entire visual display, or data which enables the visual display to be generated by each fleet member using suitable graphics software configured to generate the display locally. Superposition of polygons onto a map showing known features of the region e.g. land boundaries, may be performed either locally or centrally.

Marking of each vehicle's position including the vehicle's (or networked fleet member more generally) own position may be performed either locally or centrally. The red area represents an area with HARD level of jamming intensity. The yellow area represents an area with MED level of jamming intensity. Typically, the map includes a designation of the "center", right of center (RC), left of center (LC) and far "right" and "left" (R and L)—from the viewpoint of the vehicle whose human operator is viewing the map. The map typically includes, e.g. as a visual representation, all estimated jammer positions detected by any of the networked objects. The map is typically updated periodically, e.g. once per second.

Typically, a GNSS jammer alert is shown or not shown to a human operator of a moving object in a given region and/or data regarding a suspected jammer and its position is or is not sent to other airplanes, and/or is or is not included in the map used by the networked airplanes, only if the position error is below a given e.g. predetermined or learned threshold. For example, a threshold position error may be 100 meters, since the method is able to achieve a position error of several e.g. less than 10 meters.

The map may contain information from other aircraft members in the same communication network which fly in the same operation area (based on the actual aircraft flying route, several miles from each direction of the route). Typically, the estimated position of a jammer converges to the jammer's true position, and the error of estimation approaches zero as objects generate more and more estimates of the jammer's position.

It is appreciated that terminology such as "mandatory", "required", "need" and "must" refer to implementation choices made within the context of a particular implementation or application described herewithin for clarity, and are not intended to be limiting, since, in an alternative implementation, the same elements might be defined as not mandatory and not required, or might even be eliminated altogether.

Components described herein as software may, alternatively, be implemented wholly or partly in hardware and/or firmware, if desired, using conventional techniques, and vice-versa. Each module or component or processor may be centralized in a single physical location or physical device, or distributed over several physical locations or physical devices.

Included in the scope of the present disclosure, inter alia, are electromagnetic signals in accordance with the description herein. These may carry computer-readable instructions for performing any or all of the operations of any of the methods shown and described herein, in any suitable order including simultaneous performance of suitable groups of operations, as appropriate. Included in the scope of the present disclosure, inter alia, are machine-readable instructions for performing any or all of the operations of any of the methods shown and described herein, in any suitable order; program storage devices readable by machine, tangibly embodying a program of instructions executable by the machine to perform any or all of the operations of any of the methods shown and described herein, in any suitable order i.e. not necessarily as shown, including performing various operations in parallel or concurrently rather than sequentially as shown; a computer program product comprising a computer useable medium having computer readable program code, such as executable code, having embodied therein, and/or including computer readable program code for performing, any or all of the operations of any of the methods shown and described herein, in any suitable order; any technical effects brought about by any or all of the operations of any of the methods shown and described herein, when performed in any suitable order; any suitable apparatus or device or combination of such, programmed to perform, alone or in combination, any or all of the operations of any of the methods shown and described herein, in any suitable order; electronic devices, each including at least one processor and/or cooperating input device and/or output device, and operative to perform, e.g. in software, any operations shown and described herein; information storage devices or physical records, such as disks or hard drives, causing at least one computer or other device to be configured so as to carry out any or all of the operations of any of the methods shown and described herein, in any suitable order; at least one program pre-stored e.g. in memory or on an information network such as the Internet, before or after being downloaded, which embodies any or all of the operations of any of the methods shown and described herein, in any suitable order, and the method of uploading or downloading such, and a system including server/s and/or client/s for using such; at least one processor configured to perform any combination of the described operations or to execute any combination of the described modules; and hardware which performs any or all of the operations of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any operation or functionality described herein may be wholly or partially computer-implemented e.g. by one or more processors. The invention shown and described herein may include (a) using a computerized method to identify a solution to any of the problems or for any of the objectives described herein, the solution optionally including at least one of a decision, an action, a product, a service or any other information described herein that impacts, in a positive manner, a problem or objectives described herein; and (b) outputting the solution.

The system may, if desired, be implemented as a network—e.g. web-based system employing software, computers, routers and telecommunications equipment, as appropriate.

Any suitable deployment may be employed to provide functionalities e.g. software functionalities shown and described herein. For example, a server may store certain applications, for download to clients, which are executed at the client side, the server side serving only as a storehouse. Any or all functionalities, e.g. software functionalities shown and described herein, may be deployed in a cloud environment. Clients, e.g. mobile communication devices, such as smartphones, may be operatively associated with, but external to the cloud.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Any "if-then" logic described herein is intended to include embodiments in which a processor is programmed to repeatedly determine whether condition x, which is sometimes true and sometimes false, is currently true or false and to perform y each time x is determined to be true, thereby to yield a processor which performs y at least once, typically on an "if and only if" basis e.g. triggered only by determinations that x is true, and never by determinations that x is false.

Any determination of a state or condition described herein, and/or other data generated herein, may be harnessed for any suitable technical effect. For example, the determination may be transmitted or fed to any suitable hardware, firmware or software module, which is known or which is described herein to have capabilities to perform a technical operation responsive to the state or condition. The technical operation may, for example, comprise changing the state or condition, or may, more generally, cause any outcome which is technically advantageous given the state or condition or data, and/or may prevent at least one outcome which is disadvantageous given the state or condition or data. Alternatively, or in addition, an alert may be provided to an appropriate human operator or to an appropriate external system.

Features of the present invention, including operations, which are described in the context of separate embodiments may also be provided in combination in a single embodiment. For example, a system embodiment is intended to include a corresponding process embodiment, and vice versa. Also, each system embodiment is intended to include a server-centered "view" or client centered "view", or "view" from any other node of the system, of the entire functionality of the system, computer-readable medium, apparatus, including only those functionalities performed at that server or client or node. Features may also be combined with features known in the art and particularly although not limited to those described in the Background section or in publications mentioned therein.

Conversely, features of the invention, including operations, which are described for brevity in the context of a single embodiment or in a certain order, may be provided separately or in any suitable sub-combination, including with features known in the art (particularly although not limited to those described in the Background section or in publications mentioned therein), or in a different order. "e.g." is used herein in the sense of a specific example which is not intended to be limiting. Each method may comprise all or any subset of the operations illustrated or described, suitably ordered, e.g. as illustrated or described herein.

Devices, apparatus or systems shown coupled in any of the drawings may, in fact, be integrated into a single platform in certain embodiments, or may be coupled via any appropriate wired or wireless coupling, such as but not limited to optical fiber, Ethernet, Wireless LAN, HomePNA, power line communication, cell phone, Smart Phone (e.g. iPhone), Tablet, Laptop, PDA, Blackberry GPRS, Satellite including GPS, or other mobile delivery. It is appreciated that in the description and drawings shown and described herein, functionalities described or illustrated as systems and sub-units thereof can also be provided as methods and operations therewithin, and functionalities described or illustrated as methods and operations therewithin can also be provided as systems and sub-units thereof. The scale used to illustrate various elements in the drawings is merely exemplary and/or appropriate for clarity of presentation, and is not intended to be limiting. Any suitable communication may be employed between separate units herein e.g. wired data communication and/or in short-range radio communication with sensors such as cameras e.g. via Wifi, Bluetooth or Zigbee.

It is appreciated that implementation via a cellular app as described herein is but an example, and, instead, embodiments of the present invention may be implemented, say, as a smartphone SDK, as a hardware component, as an STK application, or as suitable combinations of any of the above.

Any processing functionality illustrated (or described herein) may be executed by any device having a processor, such as but not limited to a mobile telephone, set-top-box, TV, remote desktop computer, game console, tablet, mobile e.g. laptop or other computer terminal, embedded remote unit, which may either be networked itself (may itself be a node in a conventional communication network e.g.), or may be conventionally tethered to a networked device (to a device which is a node in a conventional communication network, or is tethered directly or indirectly/ultimately to such a node).

Any operation or characteristic described herein may be performed by another actor outside the scope of the patent application and the description is intended to include apparatus, whether hardware, firmware or software, which is configured to perform, enable or facilitate that operation, or to enable, facilitate or provide that characteristic.

The terms processor or controller or module or logic as used herein are intended to include hardware such as computer microprocessors or hardware processors, which typically have digital memory and processing capacity, such as those available from, say Intel and Advanced Micro Devices (AMD). Any operation or functionality or computation or logic described herein may be implemented entirely or in any part on any suitable circuitry including any such computer microprocessor/s, as well as in firmware or in hardware, or any combination thereof.

It is appreciated that elements illustrated in more than one drawing, and/or elements in the written description, may still be combined into a single embodiment, except if otherwise specifically clarified herewithin. Any of the systems shown and described herein may be used to implement or may be combined with, any of the operations or methods shown and described herein.

It is appreciated that any features, properties, logic, modules, blocks, operations or functionalities described herein which are, for clarity, described in the context of separate embodiments, may also be provided in combination in a single embodiment, except where the specification or general knowledge specifically indicates that certain teachings are mutually contradictory, and cannot be combined. Any of the systems shown and described herein may be used to implement, or may be combined with, any of the operations or methods shown and described herein.

Conversely, any modules, blocks, operations or functionalities described herein, which are, for brevity, described in the context of a single embodiment, may also be provided separately or in any suitable sub-combination, including with features known in the art. Each element e.g operation described herein may have all characteristics and attributes described or illustrated herein or according to other embodiments, may have any subset of the characteristics or attributes described herein.

The invention claimed is:

1. A method facilitating safe motion of objects, the method comprising providing GNSS jammer detection functionality, including a hardware processor configured to detect jammers, to at least one networked fleet including plural moving objects, wherein at least one object has, aboard, GNSS functionality and a hardware processor, and wherein information indicative of at least one GNSS jammer position is shared between said plural moving objects, wherein said GNSS jammer detection functionality includes functionality for identifying positions of GNSS jammers, the method further comprising using a GNSS jammer position output generator, including a hardware processor configured to generate and present a display of an area, in which the moving object is moving, in which various levels of jamming intensity are differentially presented, wherein said hardware processor is configured to connect geographical positions for which a first level of jamming intensity was detected, to yield a first polygon which is presented in a first manner, and also to connect geographical positions for which at least a second level of jamming intensity was detected, to yield at least one second polygon which is presented in a second manner, and wherein said first polygon presented in a first manner is presented as a first semi-transparent colored region having a first color and superimposed over a map of the area and wherein said second polygon presented in a second manner is presented as a second semi-transparent colored region having a second color, different from said first color, and superimposed over the map of the area.

2. The method of claim 1 wherein the plural moving objects each use a satellite navigation system and wherein the hardware processor is configured to maintain a table of jammed positions, each of which is indicative of a possible GNSS jammer position, and wherein at least a portion of said table is shared between the plural moving objects.

3. The method of claim 2 wherein the hardware processor is configured to determine that certain object positions in the table of jammed positions are GNSS jammer positions, if a certain criterion is satisfied (e.g. the direction from which the jamming is coming from is a previously known GNSS jammer position).

4. The method of claim 3 wherein at least one object position which has been determined to be a GNSS jammer position is shared between the plural moving objects and wherein at least one object position which has not been determined to be a GNSS jammer position is not shared between the plural moving objects.

5. The method of claim 2 wherein said satellite navigation system comprises GNSS.

6. The method of claim 1 wherein said various levels of jamming intensity are color-coded.

7. The method of claim 1 wherein said moving objects include at least one of the following groups: an aircraft, a drone, a car or other ground vehicle and a maritime vessel.

8. The method of claim 1 wherein radio communication is provided between the plural moving objects thereby to yield a networked fleet of moving objects.

9. The method of claim 1 wherein said functionality for identifying positions of GNSS jammers processes GNSS data but GNSS data which is pre-known not to be reliable for identifying positions of GNSS jammers are filtered out rather than being processed.

10. The method of claim 9 and wherein said GNSS data which is pre-known not to be reliable includes GNSS data pertaining to a time in which an aircraft is flying upside down.

11. The method of claim 1 wherein said moving objects include at least one drone.

12. The method of claim 1 wherein said moving objects include at least one ground vehicle.

13. The method of claim 1 wherein said moving objects include at least one maritime vessel.

14. A system facilitating safe motion of objects, wherein at least one object has, aboard, GNSS functionality and a hardware processor the system comprising:

GNSS jammer detection functionality residing on a hardware processor in data communication with at least one networked fleet including plural moving objects, which is configured to generate information indicative of at least one GNSS jammer position for sharing between said plural moving objects, wherein said GNSS jammer detection functionality includes functionality for identifying positions of GNSS jammers, the system further comprising a GNSS jammer position output generator, including a hardware processor configured to generate and present a display of an area, in which the moving object is moving, in which various levels of jamming intensity are differentially presented, wherein said hardware processor is configured to connect geographical positions for which a first level of jamming intensity was detected, to yield a first polygon which is presented in a first manner, and also to connect geographical positions for which at least a second level of jamming intensity was detected, to yield at least one second polygon which is presented in a second manner, and wherein said first polygon presented in a first manner is presented as a first semi-transparent colored region having a first color and superimposed over a map of the area and wherein said second polygon presented in a second manner is presented as a second semi-transparent colored region having a second color, different from said first color, and superimposed over the map of the area.

15. The system of claim 14 wherein said moving objects include at least one of the following groups: an aircraft, a drone, a car or other ground vehicle and a maritime vessel.

16. A computer program product, comprising a non-transitory tangible computer readable medium having computer readable program code embodied therein, said computer readable program code adapted to be executed to implement a method facilitating safe motion of objects, the method comprising: providing GNSS jammer detection functionality including a hardware processor configured to detect jammers, to at least one networked fleet including plural moving objects, wherein at least one object has, aboard, GNSS functionality and a hardware processor, and wherein information indicative of at least one GNSS jammer position is shared between said plural moving objects, wherein said GNSS jammer detection functionality includes functionality for identifying positions of GNSS jammers, the method further comprising using a GNSS jammer position output generator, including a hardware processor configured to generate and present a display of an area, in which the moving object is moving, in which various levels of jamming intensity are differentially presented, wherein said hardware processor is configured to connect geographical positions for which a first level of jamming intensity was detected, to yield a first polygon which is presented in a first manner, and also to connect geographical positions for which at least a second level of jamming intensity was detected, to yield at least one second polygon which is presented in a second manner, and wherein said first polygon presented in a first manner is presented as a first semi-transparent colored region having a first color and superimposed over a map of the area and wherein said second polygon presented in a second manner is presented as a second semi-transparent colored region having a second color, different from said first color, and superimposed over the map of the area.

* * * * *